No. 808,184. PATENTED DEC. 26, 1905.
W. B. BARNES & W. A. EDELMAN.
DOUGH RAISER.
APPLICATION FILED MAY 11, 1905.
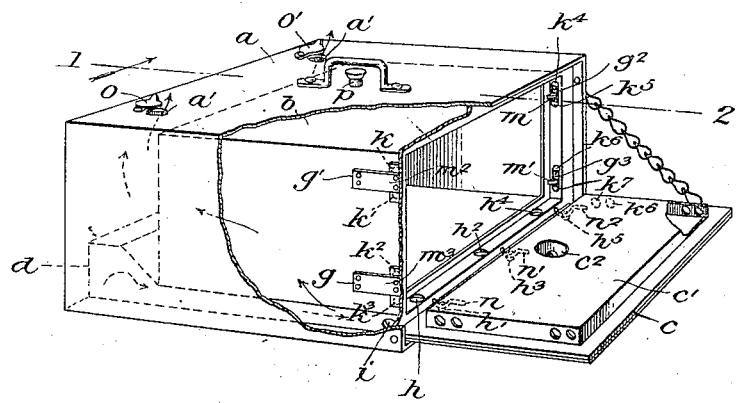
Fig. 1.
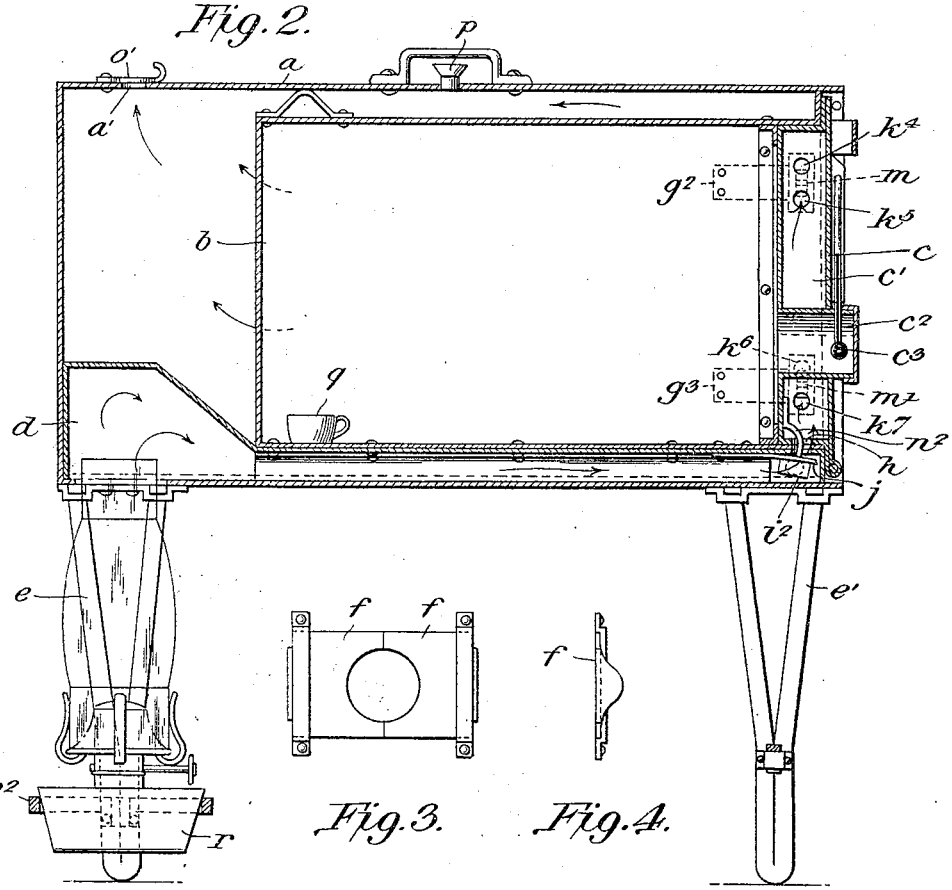
Fig. 2.
Fig. 3. Fig. 4.
Witnesses:
Arthur H. Stone
John Simpson Jr
Inventors,
William B. Barnes & William A. Edelman
per
Oswald Jackson Attorney

UNITED STATES PATENT OFFICE.

WILLIAM B. BARNES, OF GREENFIELD, AND WILLIAM A. EDELMAN, OF FAYETTE, ILLINOIS.

DOUGH-RAISER.

No. 808,184.     Specification of Letters Patent.     Patented Dec. 26, 1905.

Application filed May 11, 1905. Serial No. 260,057.

*To all whom it may concern:*

Be it known that we, WILLIAM B. BARNES, a resident of the town of Greenfield, and WILLIAM A. EDELMAN, a resident of the town of Fayette, in the county of Greene and State of Illinois, have invented new and useful Improvements in Dough-Raisers, of which the following is a description, reference being had to the accompanying drawings, which are a part of this specification.

Our invention has relation to improvements in the construction of a device for warming dough to the required temperature to cause the same to "rise" preparatory to baking; and its object is to provide a dough-raising oven so constructed that the heat from an ordinary coal-oil lamp will circulate continuously around a case or oven holding the dough.

A further object is to provide a means whereby the heat is enabled to circulate through the chamber in the door of the apparatus, which means will work automatically, closing when the door is open, thus preventing any odor from entering the oven or the room, which will be more fully set forth in the following specification.

In the accompanying drawings, Figure 1 is a perspective view of the entire construction of our device, in which a part of the outer casing is cut away. Fig. 2 is a vertical section of Fig. 1 on the line 1 2. Fig. 3 is a view of the slides which encircle the lamp-chimney when placed in position to heat the oven, and Fig. 4 is an end view of Fig. 3.

In the drawings in Fig. 1 the letter $a$ indicates the outer casing. $a'\ a'$ are vent-openings; $b$, the inner casing or oven; $c$, the oven-door with the chamber $c'$ mounted thereon; $c^2$, an opening passing through the door $c$ and the chamber $c'$ to allow the heat of the oven to be registered on the thermometer, (see Fig. 2;) $c^3$, Fig. 2, the thermometer; $d$, the heat-conductor; $e\ e'$, Fig. 2, the legs, two of which support the rear and two the front part of the entire construction. These legs are detachable and can easily be taken from their socket. Attached to the two rear legs is a lamp-holder $e^2$, Fig. 2.

$f f$, Fig. 3, are sliding shutters which encircle the lamp-chimney.

$g\ g'\ g^2\ g^3$ are springs, one end of which is fixedly attached to the oven, the other end attached to valves, said valves being provided with projections $m\ m'\ m^2\ m^3$, which when valves are seated (the door being open) extend on the inside of oven.

$h\ h'\ h^2\ h^3\ h^4\ h^5$ are openings so arranged that when oven-door is closed $h\ h^2\ h^4$ are beneath $h'\ h^3\ h^5$.

$i\ i^2$, Figs. 1 and 2, are openings in heat-conductor $d$. These openings are so placed that when door $c$ is open and all valves closed they are open; $j$, a valve attached to a spring, said spring being fixedly attached to oven. Three of these valves are used to cover openings $h\ h^2\ h^4$. The two outer valves have their sides projecting inwardly, so that when door $c$ is closed and valve $j$ is pressed from its seat the projecting side of valve $j$ will cover the openings $i\ i^2$.

$k\ k'\ k^2\ k^3\ k^4\ k^5\ k^6\ k^7$ are openings in the chamber $c'$. These openings exactly correspond to like openings in the oven $b$.

$l$ is an asbestos pad or cushion against which the door closes.

$m\ m'\ m^2\ m^3$ are projections extending inwardly from the valves attached to springs $g\ g'\ g^2\ g^3$.

$n\ n'\ n^2$ are curved rods, one end of which is fixedly attached to the inside of chamber $c$. The free end extends through the openings $h'\ h^3\ h^5$. These extended ends when door is closed come in contact with valves covering openings $h\ h^2\ h^4$.

$o\ o'$ are sliding covers for vent-openings.

$p$ represents a heat-regulator; $q$, a small cup to hold water to supply necessary moisture in oven; $r$, an ordinary lamp.

The operation of our invention is as follows: The slides $f f$, Fig. 3, are opened to admit the lamp-chimney in order that the lamp $r$ may be placed in the holder $e^2$ when said slides $f f$ are closed. The heat from the lamp $r$ (the door $c$ being open and all valves closed by reason of the springs attached thereto) is conveyed by the conductor $d$ under the oven $b$ and passes out of the openings $i\ i^2$, Figs. 1 and 2, in the direction indicated by the arrows in Fig. 1 and out of the vent-openings $a'\ a'$. When the door $c$ is closed, the chamber $c'$ comes in contact with the projections $m\ m'\ m^2\ m^3$, attached to valves $g\ g'\ g^2\ g^3$. Also the ends of curved rods $n\ n'\ n^2$, which extend through the openings $h'\ h^3\ h^5$ in the chamber $c'$, come in contact with the valves $j\ j'\ j^2$, ($j'\ j^2$ not shown,) which presses the said valves $g\ g'\ g^2\ g^3\ j\ j'\ j^2$ from their seats, and by reason of the fact that the projecting sides of the valve $j$, Fig. 2, and $j^2$ (not shown) now cover the openings $i$ $i^2$, Figs. 1 and 2, the heat takes a different course, as indicated by the arrows in Fig. 2, passing through openings $h$ $h'$ $h^2$ $h^3$ $h^4$ $h^5$ into chamber $c'$, thence through openings $k$ $k'$ $k^2$ $k^3$ $k^4$ $k^5$ $k^6$ $k^7$ into the space between the oven $b$ and casing $a$, thence out of the vent-openings $a'$ $a'$, thus encircling the oven $b$. The mercury-bulb of the thermometer $c^3$ being incased in sleeve in the opening $c^2$, which passes through door $c$ and chamber $c'$, registers the temperature on the indicator outside the oven-door $c$.

Having thus fully described our invention, what we claim, and desire to secure by Letters Patent, is—

1. In a dough-raiser, the combination of an outer casing provided with legs or supports, and slides to encircle a lamp-chimney, a lamp, an inner casing spaced from the outer casing and provided with openings in its sides and bottom portions, valves to close said openings, and a door adapted, when closed, to remove the valves from their seats and when open, to permit said valves to assume their normal positions.

2. In a dough-raiser, the combination of an outer casing provided with legs or supports, and slides to encircle a lamp-chimney, a lamp, an inner casing spaced from the outer casing and provided with openings in its sides and bottom portions, valves to close said openings and a door, having a chamber mounted thereon, said chamber provided with openings in its sides and bottom portions, also provided with an opening passing through the door and the chamber mounted thereon, said opening provided with a sleeve, a thermometer attached to the door with its bulb within said sleeve, said door adapted when closed to remove the valves from their seats and when open, to permit said valves to assume their normal positions.

3. In a dough-raiser the combination of an outer casing provided on its under side with legs or supports and slides to encircle a lamp-chimney, a door, a lamp, an inner casing spaced from the outer casing and provided with valves attached to springs, said springs being fixedly attached to said inner casing in such manner as to allow said valves to cover openings in sides and bottom portions thereof, said valves, on the sides, being provided with projections extending inwardly and adapted, when the door is closed, to engage with the sides of the chamber which is mounted on said door, thus removing the valves from their seats to allow the free passage of the heat and the circulation thereof around the inner casing and the chamber mounted on said door, two of the valves covering the openings in the under portion of inner casing being provided with projecting sides adapted, when the door is closed and said valves are removed from their normal position, to cover the openings in the heat-conductor, all substantially as set forth.

In testimony whereof we affix our signatures in presence of two witnesses.

WILLIAM B. BARNES.
WILLIAM A. EDELMAN.

Witnesses:
H. H. MONTGOMERY,
M. T. CULWELL.